INVENTOR
WILLIAM MC KINLEY BAIRD
BY James R. McKnight
ATTORNEY

Fig. 6.

March 9, 1948. W. McK. BAIRD 2,437,451
LOCKER REFRIGERATING SYSTEM
Filed April 27, 1944 7 Sheets-Sheet 5

INVENTOR
WILLIAM MC KINLEY BAIRD
BY James R. McKnight
ATTORNEY

Patented Mar. 9, 1948

2,437,451

UNITED STATES PATENT OFFICE 2,437,451

LOCKER REFRIGERATING SYSTEM

William McKinley Baird, Chicago, Ill.

Application April 27, 1944, Serial No. 532,977

10 Claims. (62—102)

This invention relates to a portable, sectional and expandable refrigerating locker system.

It has long been a much needed development and a desired objective of the food preservation and the material testing industries to have available a refrigerated locker system to freeze, preserve, store and test foods, biologicals, materials, at subfreezing temperatures, ranging from 10 degrees to —100 degrees, Fahrenheit, economically, practically and safely.

In the industrial and commercial fields there are certain biologicals and materials that require a testing and ageing period at very low subfreezing temperatures.

In the present operated types of equipment there is either a refrigerated area known as a locker plant or depot within which the user must enter or a deep well cabinet opened from the top and requiring that the individual reach into the cabinet to secure the desired stored products.

The present operated plants or depots and the deep well type container utilize ice, dry ice, or a series of pipe coils as the refrigeration media. The pipe coils are suspended from the ceiling or attached on the surrounding side walls which chills the air. The chilled air gradually descends to the lower levels of the plant or cabinet.

In the material testing operations it has been the general practice to place the biologicals and materials into the deep well type container irrespective of their type for sub-freezing temperature testing. This is undesirable because no segregation of the biologicals and materials is possible.

Furthermore, a coating of ice or other objectionable matter accumulates on the biologicals or materials to be tested, thereby counteracting the benefits of the tests at the sub-freezing temperatures.

To secure foods, biologicals and other materials from the plants or depots it is necessary or desirable that the individual user entering the plant wear additional clothing. This additional clothing is maintained at the plant or depot by the operator and is exchanged with and between the patrons. This practice is severely criticised and justifiably objected to by the user from a health viewpoint. The objection to this practice has reached such an extent that many patrons have discontinued their patronage. Also, due to the necessity of the users being required to enter into and expose themselves to the sub-freezing temperatures, many patrons have become sick or injured in health through shock, exposure, chills or freezing.

In these plants or depots spaces for aisles and overhead pipes are necessary. This type of plant or depot is not efficient as it wastes refrigerated space, equipment and power.

These plants and the deep well type containers do not lend themselves to further expansion for increased capacities without the necessity of a complete and costly reconstruction program, and are not easily moved to other locations.

Among the objects of my invention is to solve the foregoing problems and to provide an improved refrigerating locker system unit comprising a plurality of sections; that is portable and expandable by sections; that utilizes forced circulated cold air as a secondary refrigerant; that has solid enclosed drawers which form with the walls of the cabinet, the air ducts in the unit; that will eliminate the requirements of an individual entering into a cold or sub-freezing temperature area from a warm temperature, thereby preventing sickness due to shock in sudden temperature changes, halting the introduction of undesirable foreign matter or bacteria, stopping the dehydration of meats and perishable products, and eliminating a coating of ice or other objectionable matter on foods, biologicals and other materials, that are being frozen, preserved, stored, tested or aged in sub-freezing temperatures for industrial, commercial or domestic usage.

My invention also contemplates such other objects, advantages and capabilities as will later more fully appear and which are inherently possessed by my invention.

While I have shown in the accompanying drawings a preferred form of my invention, yet I wish it understood that the same is susceptible of modification and change without departing from the spirit of my invention.

Referring to the drawings, Fig. 6 is an enlarged transverse sectional view of the preferred primary refrigerant section cooling equipment, using a split fin coil, taken on line 6—6 of Fig. 5.

Figure 1:
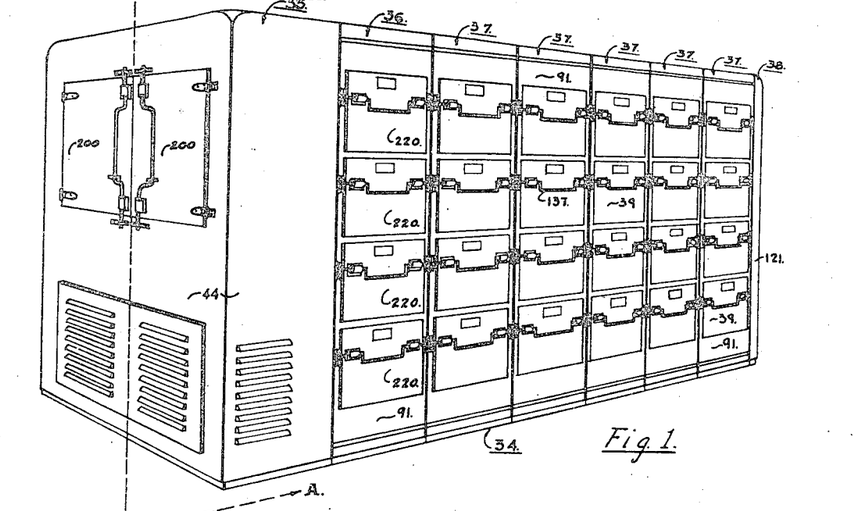
Fig. 1 is a perspective view of a unit comprising a primary refrigerant section, a freezer section, a plurality of drawer sections, and an end panel section.
Figure 2:
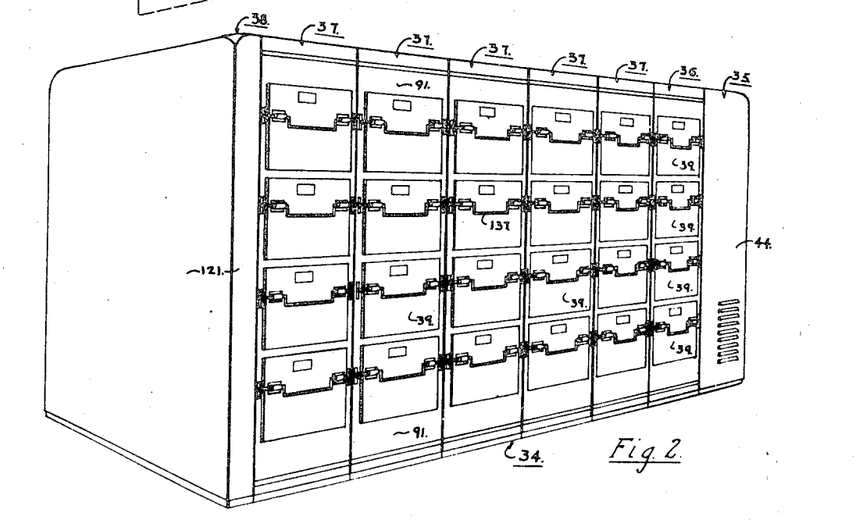
Fig. 2 is a perspective view opposite to the end view shown in Fig. 1.

The embodiment selected to illustrate my invention discloses my refrigerating locker system 34 comprising a primary refrigerant section 35, a freezer section 36, a plurality of drawer sections 37, and an end panel section 38 as shown in Figs. 1 and 2.

Another embodiment of my refrigerating locker system 34, comprises a primary refrigerated section 35, a plurality of drawer sections 37 and an end panel section 38.

The drawer section 37 as illustrated in Figs. 1 and 2, has four drawers in a tier, but a tier may consist of one or more drawers, 39, slidable and withdrawable by the user without the user having to enter the sub-freezing interior of drawer section 37 or refrigerating locker system 34.

It is, of course, within the spirit of my invention that the refrigerating locker system 34 may be smaller or larger and that it may be formed of one or any plurality of drawer sections or can be a combination of any plurality of sections 35, 36, 37 and 38. The tier of drawers as shown of course does not limit the drawer section 37 to four drawers but may be any desirable number of drawers or lockers.

In my refrigerating locker system 34, I prefer to have a double unit with lockers or drawers on either side or on both sides as shown in Figs. 1 and 2.

My refrigerating locker system 34 is cooled or sub-freezing temperatures introduced through a primary refrigerant section 35 that removes the heat elements from the air to create cold air as a secondary refrigerant that is introduced into freezer section 36 and locker sections 37 by forced circulation by fans, blowers or other suitable means, wasting the secondary refrigerant or returning it to the primary refrigerant section 35.

I define my secondary refrigerant as cold air from which heat has been extracted and which is circulated by fans, blowers or the like.

The primary refrigerant section 35 comprises two divisions or areas, an upper insulated area 41 and an uninsulated lower area 42. The upper insulated area 41 has an inner shell 43, an outer shell 44 and closes the space therebetween which is filled with cold resistant insulating material 45 as shown in Figs. 5 and 6.

Figure 5:
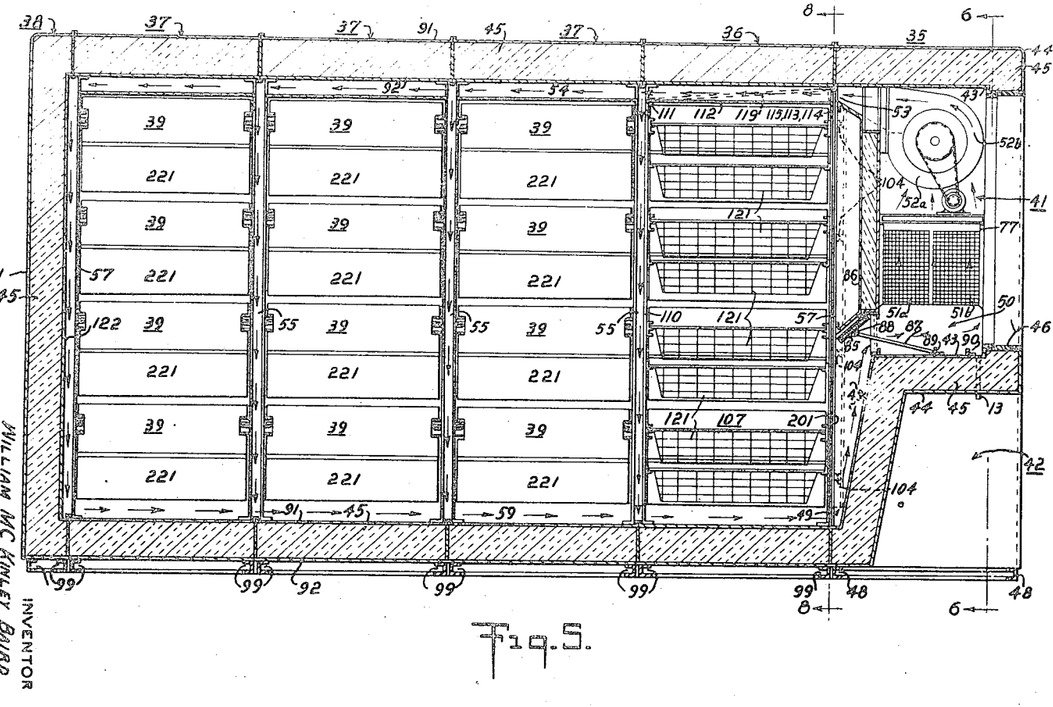
Fig. 5 is a longitudinal sectional view of the unit comprising a primary refrigerant section, a freezer section, a plurality of drawer sections, and an end panel section taken on line 5—5 of Fig. 1.

Around the refrigerator door opening in the upper insulated area 41 is a breaker strip 46 of rubber or other suitable material that is attached to the inner shell 43 and the outer shell 44 as shown in Fig. 5.

The uninsulated lower area 42 is enclosed by the continuation of the outer shell 44 wherein an angle iron frame work 47 is attached to the under side of the upper insulated area 41 by welding or other suitable means. The angle iron framework 47 thereby transmits the weight of the upper insulated area 41 to a channel iron frame base 48 as shown in Fig. 6.

The secondary refrigerant used for cooling or transmitting sub-freezing temperatures into freezer section 36 and drawer section 37 is forced circulated air that has had the heat units removed in the insulated area 41 of the primary refrigerant section 35 as shown in Figs. 5 and 6.

In operation the secondary refrigerant enters the insulated area 41 of the primary refrigerant section 35 through an intake duct 49 passing upwardly on a slight diagonal into chamber 50. The secondary refrigerant expands in chamber 50 and is then pulled through a split fin coil 51 by rotating blowers 52a and 52b, whence it is pressure forced through outlet duct 53 into the top horizontal circulating duct 54, and then downwardly into vertical ducts 55, 56, 57 and 58.

Figure 15:
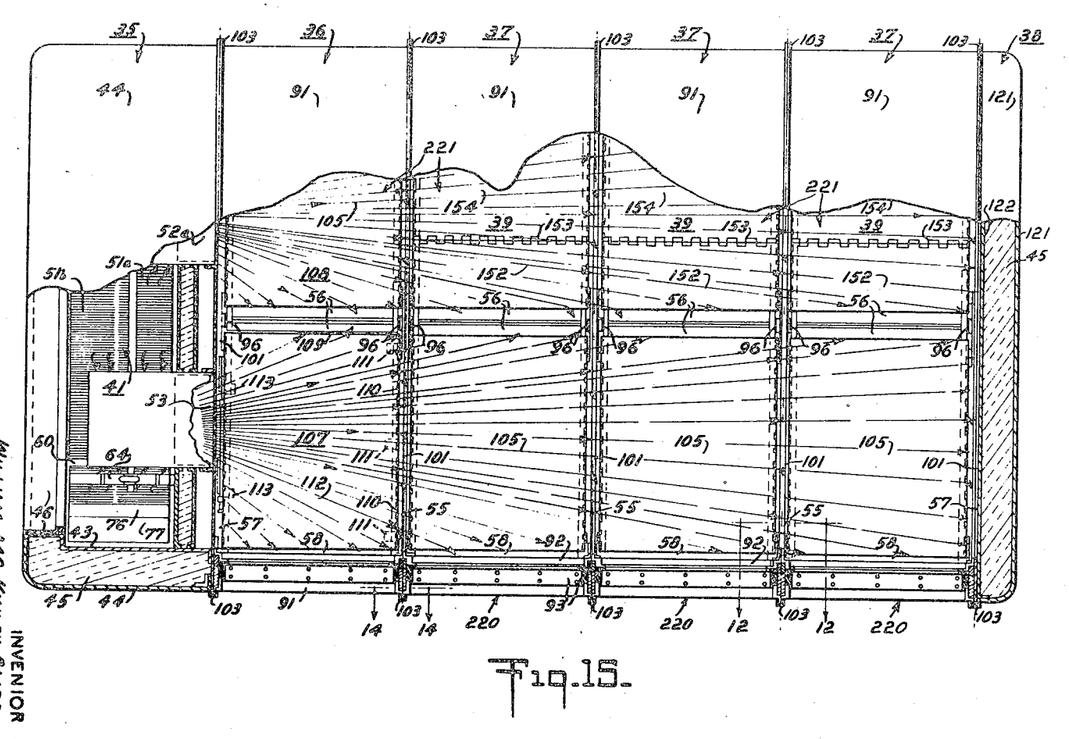
Fig. 15 is a top cut-away plan view of the locker system unit composed of a primary refrigerant section, a freezer section, a plurality of drawer sections, an end panel section, showing the circulation of the secondary refrigerant through the split fin coil and being forced circulated by the blower fans through the top ducts and down the vertical ducts formed by the enclosed drawers.

The secondary refrigerant then enters into the lower horizontal duct 59 and then through intake duct 49, thereby completing the cycle of circulation as shown in Figs. 5, 6 and 15.

The formation of ducts 55 to 59 inclusive, within the drawer sections 37 involves the construction of the drawers and their positioning with relation to each other and the walls of the section.

My drawer 39 consists of a drawer head 220 and to the rear a spaced container portion 221, with vertical air space 58 therebetween.

The drawer section 37 comprises an outer shell 91 and an inner shell 92 which closes the space therebetween and which is filled with cold resistant insulating material 45. Around each of the openings of the drawer section 37, is a breaker strip 93 of rubber or other suitable material that is attached to outer shell 91 and inner shell 92 as shown in Figs. 8, 9, 12 and 15.

On each of the opposite sides of inner shell 92 is attached a pair of angle iron frames 94 as structural supporting members with web plates 95 for load stresses.

Centrally located between the two opposite inner shells 92 are a pair of channel iron frames 96 with web plates 97 attached to the top and bottom inner shells 92 by welding or other suitable means.

Attached to angle iron frame 94 and channel iron frame 96 are drawer guide channels 98 for the withdrawal and insertion of drawers 39 as shown in Figs. 8, 9, 10 and 11.

Figures 3, 4, 9:
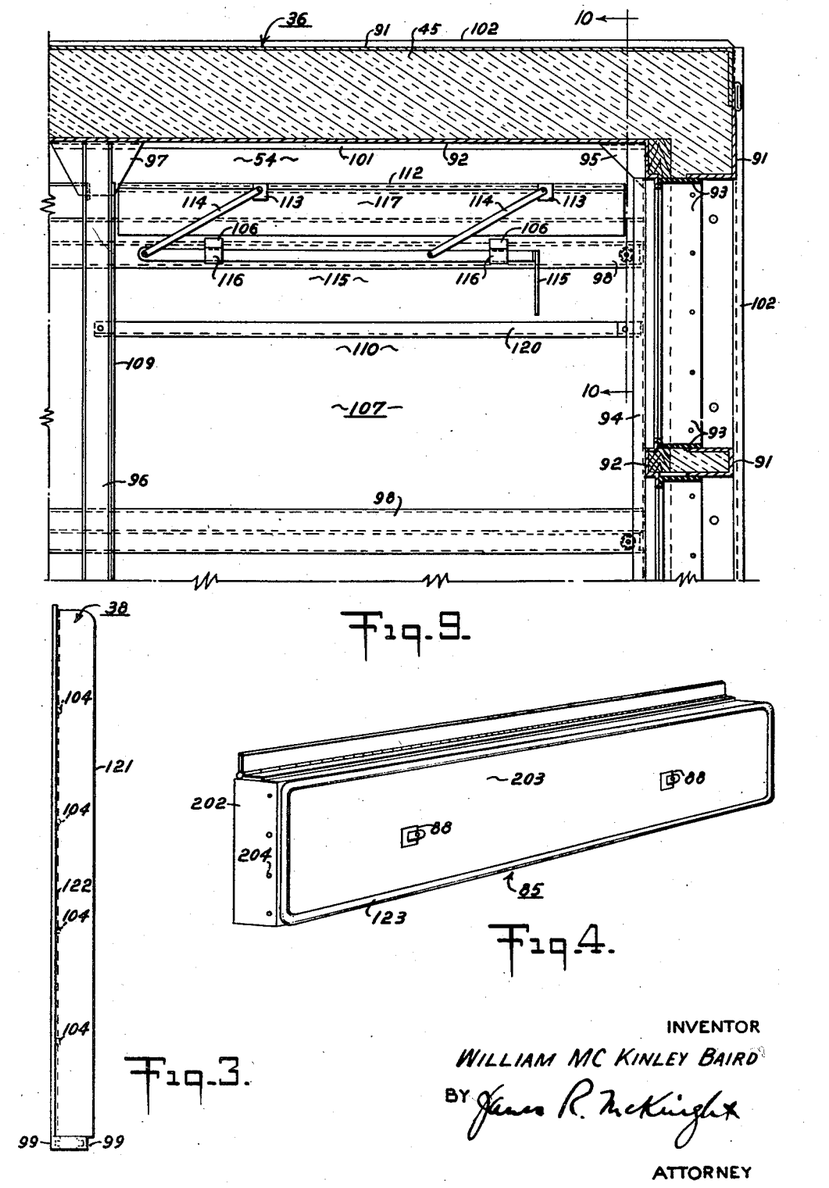
Fig. 3 is a side view of the end panel section.
Fig. 4 is an enlarged perspective view of the primary refrigerant section return air baffle showing a continuous hinge and, handle attachments.
Fig. 9 is an enlarged detailed sectional view of the air deflector baffle plate in the freezer section taken on line 9—9 of Fig. 8.

The outer shell 91 on the bottom of the section 37 is attached to a pair of angle or channel iron leveling frames 99 as shown in Fig. 9.

Around the edge of inner shell 92 right angle lips 100 are on each side of the section so that when sections are joined together a rubber interior sealing strip 101 is supermounted to eliminate infiltration or penetration of moisture into insulation material 45, as shown in Figs. 8, 9, 12 and 15.

Each section of the outer shell 91 has an angle lip 102 which abuts the corresponding lip 102 of an adjacent section, and supermounted thereon is an exterior sealing gasket or strip 103.

Figures 12, 13:
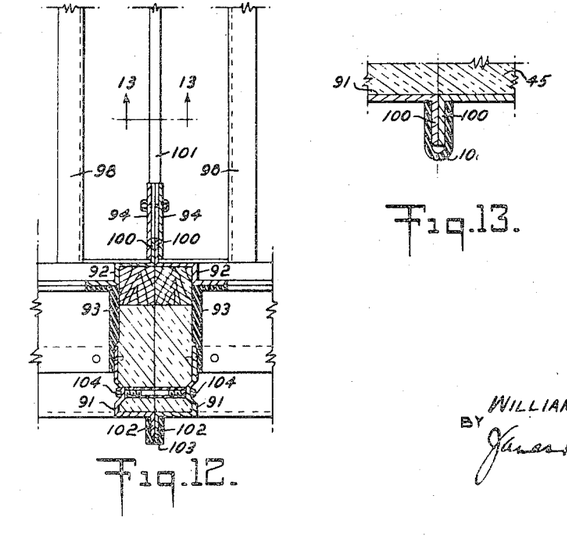
Fig. 12 is an enlarged detailed plan view of the joining of the sections together, taken on line 12—12 of Fig. 15.
Fig. 13 is an enlarged cross-sectional view of the interior sealing strip, when the sections have been joined together, taken on line 13—13 of Fig. 12.
Figure 14:
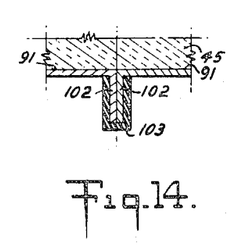
Fig. 14 is an enlarged cross-sectional view of the exterior sealing strip, when the sections have been joined together, taken on line 14—14 of Fig. 15.

All sections are joined together by hexagonal interlocking coupling bolts 104 extending through the outside shell faces 91, as shown in Fig. 12, or by other suitable means.

Figure 8:
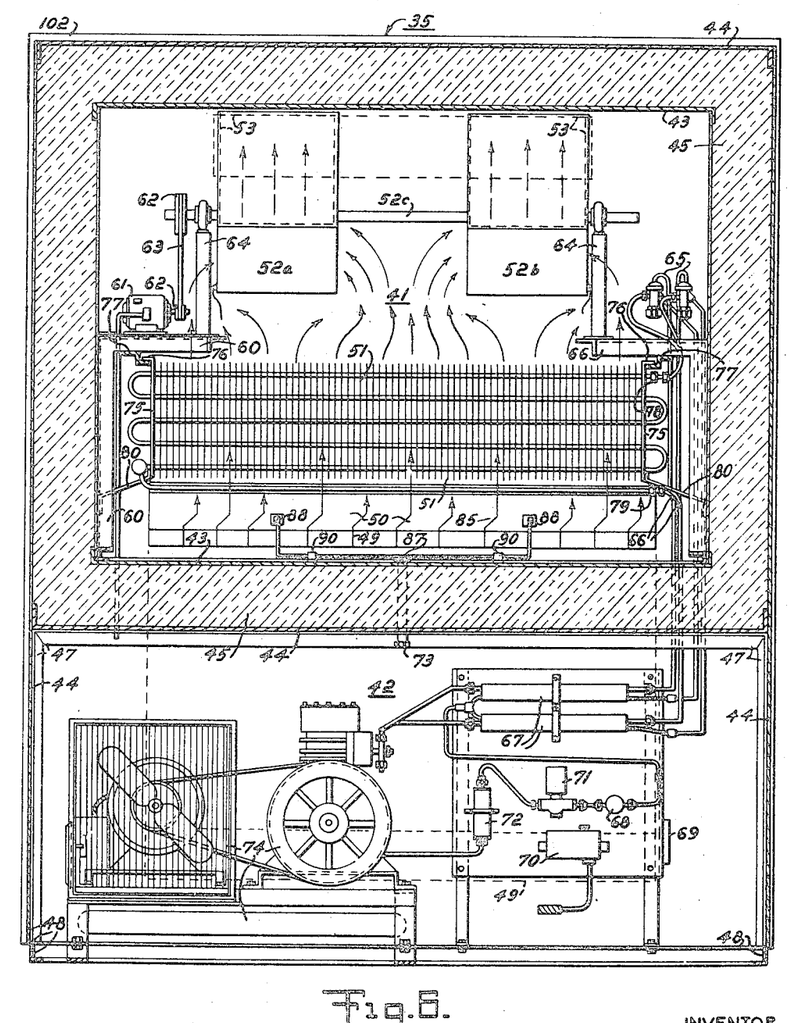
Fig. 8 is a transverse sectional view through the freezer section, taken on line 8—8 of Fig. 5.
Figure 11:
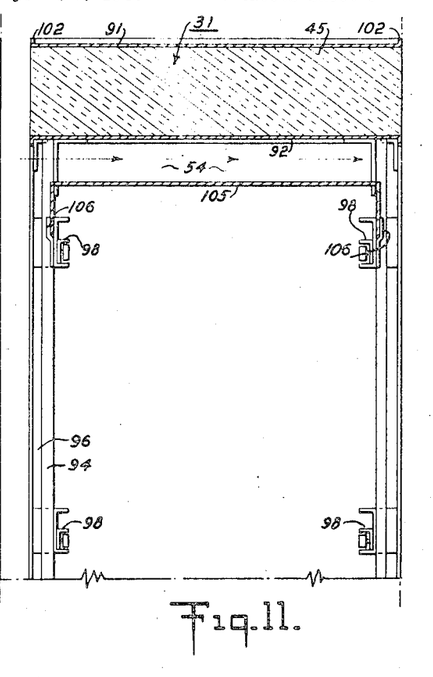
Fig. 11 is an enlarged detailed cross sectional view of the air guide baffles in the drawer section, taken on line 11—11 of Fig. 8.

When a drawer with an open top position is used in the drawer sections 37 air guide baffle plates 105 are placed over the top pair of drawer guide channels 98 and inserted into angle brackets 106 as shown in Figs. 8, 11 and 15.

When drawer 39 is used air guide baffles 105 are not used.

Vertical ducts 58 are formed by the space between the back of the drawer head and the front of the drawer container.

Vertical ducts 56 are formed by the space between the backs of oppositely disposed drawers.

Vertical ducts 55 are formed by the space between sides of adjacent drawers.

Vertical ducts 57 are formed by the space between the side of the drawer and the adjacent side of the inner wall of the primary refrigerant section on one end and the inner wall of the end panel section.

Vertical ducts 55, 56, 57 and 58 are each smaller in cross section than horizontal ducts 54 and 59. This construction plus vertical ducts 57 and 58 being smaller in cross section than the other vertical ducts 55 and 56 sets up an obstruction at both ends of horizontal duct 54 and at the locker front openings 58, thereby creating a back pressure causing an evenly distributed flow of the secondary refrigerant through the system 34, as shown in Figs. 5 and 15.

Referring now to the primary refrigerant sections 34, in the upper insulated area 41, an angle iron framework shelf 60 is attached to the inner shell 43. On this support is positioned a blower motor 61 operating a pulley belt 63 extending between pulleys 62. A pair of spaced brackets 64 also mounted on shelf 60 support a rotating shaft 52c which supports a pair of spaced horizontal discharge blower fans 52a and 52b. The upper pulley 62 engaging shaft 52c rotates it so as to move blower fans 52a and 52b in a counter-clockwise manner.

Figure 7:
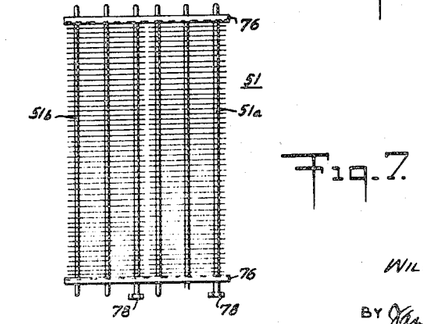
Fig. 7 is a plan view of the split fin coil of the primary refrigerant section cooling equipment shown in Figs. 5 and 6.

Also within area 41 I provide a split fin coil 51 constructed of a plurality of spaced parallel fin coils preferably a pair 51a and 51b, mounted on the same end plates 75. The end plates 75 have right angle portions 76 slidable within spaced brackets 77 attached to the under portion of shelf 60, so that coil 51 is suspended within area 41 as shown in Figs. 5, 6 and 7.

Each of the parallel fin coils 51a and 51b has an intake orifice 78 and a return outlet 79.

In the ordinary undivided fin coil heretofore used, the air from duct 49 entering chamber 50 below the coil tends to enter that portion of the coil nearest duct 49. This results in the by-passing of the outer portion of the coil so that approximately only one-half the coil is efficiently operating.

In my construction 51a is similar to that portion of a single coil nearest duct 49, and 51b is similar to that portion remote from the duct 49.

My fin coil is split into two sections, 51a and 51b. I can control the amount or volume of the primary refrigerant or fluid directed into either section as may be desired, and in use I increase the amount or volume of the primary refrigerant or fluid through section 51b and cause the surfaces of section 51b to be colder than the surfaces of section 51a.

Because warm air has an affinity towards cold objects, or surfaces, the colder the object, or surfaces, the greater the affinity or attraction. Therefore, by increasing the amount or volume of the primary refrigerant, or fluid, through section 51b, over the amount through section 51a, I have caused a greater affinity for the air from chamber 50 to pass through section 51b than through section 51a. This results in utilizing the surfaces of the two sections of the fin coil to their maximum capacity and provides a greater efficiency in the supplying of the secondary refrigerant at reduced operating cost and time.

Attached to the lower portions of each of the end plates 75 is a guide plate 80 for guiding the secondary refrigerant in chamber 50 direct to coil 51, thereby preventing the secondary refrigerant from moving around and above coil 51 and bypassing the same.

I provide a drain outlet 73 with a suitable connection on the end, at the bottom of area 41.

On each of fin coils 51a and 51b is attached at intake orifice 78 a thermostatic expansion valve and pot type header 65. At the return outlet 79 of each fin coil is mounted a thermostatic expansion valve bulb 66, which is connected by lines 305 with thermostatic expansion valve 65.

From each outlet orifice 79 of each coil 51a and 51b is a tube connection leading from area 41 to area 42 and to separate heat exchangers 67. From the two heat exchangers 67, the primary refrigerant enters into condensing unit 74, fully equipped with a suitable motor, magnetic high and low pressure controls and water inlet, and outlet connections (not shown).

From the condenser 74, the primary refrigerant line passes by silica gel drier 72, solenoid valve 71, liquid primary refrigerant indicator 69 back into the two heat exchangers 67, from which a line leads from each heat exchanger 67 to each of the thermostatic expansion valves and pot type headers 65 completing the cycle. Main electrical control box 69 supplying power of the operation of condenser 74 is shown in Fig. 6 as is also thermostatic control 70.

Between intake duct 49 and chamber 50 is a return air baffle 85 hinged to an insulated segregating panel 86 attached to section wall 201. A handle 87 is pivotally attached by attachment 88 to baffle 85. The air baffle 85 is held in an open position when handle 87 rests against cleats 89. The return air baffle 85 is closed by drawing it forward with handle 87, which is then placed over cleats 90, as shown in Figs. 5 and 6.

My return air baffle 85 is constructed with an outer shell 202, which is filled with cold resistant insulation material 45. Another shell 203 with a surrounding gasket 123 is telescoped into shell 202, and held therein by screws 204 extending therethrough, as shown in Figs. 4 and 5.

To defrost the cooling or sub-freezing equipment in upper insulated area 41 the condensing unit 74 is shut off at electrical junction box 69. The refrigerator doors 200 shown in Fig. 1 are opened and the return air baffle 85 is closed. The split fin coil 51 or the cold plates 81 can then be defrosted by spraying with water that drains out of the insulated area 41 through drain connection 73 as shown in Figs. 5 and 6.

Figure 10:
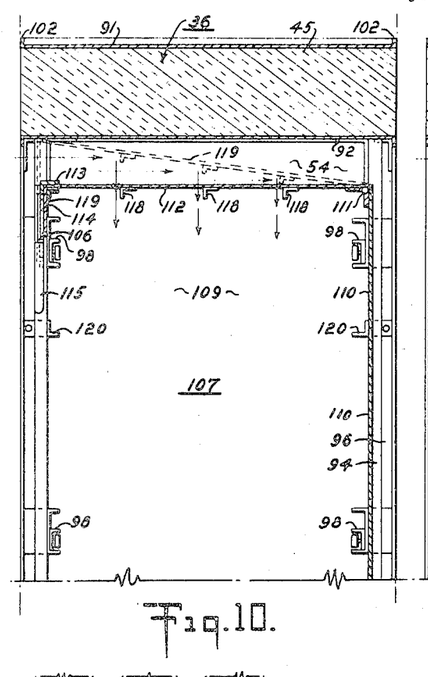
Fig. 10 is an enlarged detailed cross sectional view of the air deflector baffle plate, taken on line 10—10 of Fig. 9.

The freezer section 36 is substantially the same construction as the drawer section 37 with the following changes:

The freezer section 36 is divided into the freezer compartment 107 and drawer compartment 108. The drawer compartment 108 is otherwise exactly the same as all other drawer sections 37. Around freezer compartment 107 is a vertical enclosure panel 109 attached to the two central channel iron frames 96, and a vertical enclosure panel 110 attached to the drawer guide channels 98, thereby separating the freezer compartment 107 from the adjoining locker sections. Attached to the vertical enclosure panel 110 are hinges 111 that are attached to an air baffle deflector plate 112. On the opposite side of air baffle deflector plate 112 are baffle clips 113 to which are riveted operating arms 114 that are riveted to baffle push rod 115, that is slidable in baffle push rod brackets 116 that are attached to drawer guide channels 98. Attached to drawer guide channel 98 are angle brackets 106 that support a baffle bracket 117 on which the air deflector baffle plate 112 rests when in a closed position. On the under side of air deflector baffle plate 112 are air deflecting angles 118 as shown in Figs. 10, 11 and 15. When foods, biologicals, or materials are to be frozen the baffle push rod 115 is pulled forward which raises the air deflector baffle plate 112 to position at 119, thereby deflecting all the air from a blower fan 52b down through the freezer compartment 107 into lower horizontal return duct 59 then into intake duct 49 for the freezing cycle in the primary refrigerant section 35, thereby completing the shortest possible secondary refrigerant freezing circuit. In each drawer opening as shown in Fig. 10, for the freezing compartment 107 there are additional angles irons 120 bolted to angle iron frame 94 and channel iron frame 96. Baskets 121 are used in the freezing compartment 107 instead of drawers 39 or drawers 40, as shown in Figs. 5 and 8.

Drawer heads 220 are used in the front openings of freezer compartment 107 of freezer section 36 as a completely removable head or may be fastened on hinges attached to the front face of outside shell 91.

End panel section 38 comprises an outside shell 121 an inside shell 122, which closes therebetween a space which is filled with cold resistant insulating material 45. The lower or bottom face of outside shell 121 is attached to a pair of angles or channel iron leveling frames 99. The end panel section 38 is attachable to adjoining sections by hexagonal interlocking coupling bolts 104 welded on the inside shell 121 as shown in Fig. 3.

Having thus described my invention, I claim:

1. A refrigerating system comprising a cabinet, a plurality of tiers of imperforate drawers positioned within said cabinet, each drawer adapted to be slidably withdrawn from and returned into said cabinet from the exterior thereof, each of said tiers of drawers spaced from the ends of the cabinet and the adjacent tier at their sides and backs to provide vertical passageways, each drawer having a front panel, and a container portion spacedly attached thereto to provide a vertical passageway in front of the container portion, the top drawers of each tier spaced from the top of said cabinet to provide a horizontal top passageway, the bottom drawers of each tier spaced from the bottom of said cabinet to provide a horizontal bottom passageway, and a primary refrigerant section within said cabinet for cooling air for use as a secondary refrigerant and having means for forcing the secondary refrigerant into said top horizontal passageway, down through said vertical passageways, and thence into said bottom horizontal passageway, said cabinet having an exit passageway leading from said bottom horizontal passageway back to said primary refrigerant section.

2. A refrigerating system comprising a cabinet, a plurality of tiers of imperforate drawers positioned within said cabinet, each drawer adapted to be slidably withdrawn from and returned into said cabinet from the exterior thereof, each of said tiers of drawers spaced from the ends of the cabinet and the adjacent tier to provide vertical passageways, the top drawers of each tier spaced from the top of said cabinet to provide a horizontal top passageway, the bottom drawers of each tier spaced from the bottom of said cabinet to provide a horizontal bottom passageway, and a primary refrigerant section within said cabinet for cooling air for use as a secondary refrigerant and having means for forcing the secondary refrigerant into said top horizontal passageway, down through said vertical passageways, and thence into said bottom horizontal passageway, said cabinet having an exit passageway leading from said bottom horizontal passageway back to said primary refrigerant section, the vertical passageway formed with the ends of the cabinet and the adjacent tiers being smaller in cross section than the cross section of the horizontal passageway and also the vertical passageway formed between the tiers.

3. A refrigerating system comprising at least one drawer section, a freezer section adjoining one end of said drawer section, a primary refrigerant section adjoining the opposite end of said freezer section for cooling air for use as a secondary refrigerant and having a pair of blowers for forcing the secondary refrigerant into said freezer and drawer sections and, a deflector baffle plate positioned in said freezer section to direct the secondary refrigerant coming from one of said blowers to said freezer section.

4. In a refrigerated system comprising a drawer section, and a primary refrigerant section adjoining the drawer section, an end plate positioned within said primary refrigerant section, a split fin coil composed of a pair of spaced coils mounted on said same end plate, one of the spaced coils being more remote than the other from the adjoining drawer section, the coil in the more remote position adapted to receive an increased flow of primary refrigerant fluid.

5. In a refrigerating system, a primary refrigerant section having an insulated portion forming an air chamber and a passage leading to said air chamber for supplying air thereto, means within said chamber for refrigerating said air, a baffle hingedly attached to the inner wall of said chamber and at an angle to said passage for directing the air directly to said refrigerating means, and a rod pivotally attached to said baffle, said chamber having a bottom wall, spaced inner and outer cleats attached to said bottom wall so that when said rod is moved against said inner cleat said baffle is held in open position and when said rod is moved against said outer cleat the baffle closes said chamber.

6. A refrigerating system comprising a plurality of drawer sections having closed top and bottom portions and open ends, said drawer sections adapted to be joined together and to receive additional drawer sections, an end panel section having closed top, bottom, and end portions, and positioned to close an open end of one of said drawer sections, a freezer section having closed top, bottom, and end portions, said freezer section positioned with one of its ends adjoining the open end of one of said drawer sections opposite to said end panel section, and a primary refrigerant section having closed top, bottom, and end portions and positioned at the other end of said freezer section, said drawer and freezer sections having containers withdrawable from the exterior of the system, each of said sections having an outer shell, an inner shell and insulating material therebetween, each of said sections having a right angle lip on its inner shell for engaging the corresponding right angle lip of an adjoining section, and sealing means supermounted on said engaging lips, each of said sections having a right angle lip on its other shell for engaging the corresponding right angle lip of an adjoining section, and sealing means supermounted on said engaging lips.

7. In a refrigerating system, at least one drawer section having closed top and bottom portions and open end portions, said drawer section adapted to receive additional drawer sections, an end panel section having closed top, bottom and end portions positioned to close an outer open end of a drawer section, and a primary refrigerant section having closed top, bottom, and end portions positioned to close an open inner end of a drawer section, said drawer section having drawers withdrawable from the exterior of the system, each of said sections having an outer shell, an inner shell and insulating material therebetween, each of said sections having a right angle lip on its inner shell for engaging the corresponding right angle lip of an adjoining section, and sealing means supermounted on said engaging lips, each of said sections having a right angle lip on its other shell for engaging the corresponding right angle lip of an adjoining section, and sealing means supermounted on said engaging lips.

8. A refrigerating system comprising a plurality of drawer sections having closed top and bottom portions and open ends, said drawer sections adapted to be joined together and to receive additional drawer sections, an end panel section having closed top, bottom, and end portions, and positioned to close an open end of one of said drawer sections, a freezer section having closed top, bottom, and end portions, said freezer section positioned with one of its ends adjoining the open end of one of said drawer sections opposite to said end panel section, and a primary refrigerant section having closed top, bottom, and end portions and positioned at the other end of said freezer section, said drawer and freezer sections having containers withdrawable from the exterior of the system, said containers in said drawer sections being imperforate and in a vertical tier, the uppermost of said containers spaced from the top portions of the drawer sections to provide a top horizontal passage, said drawer sections spaced from adjacent drawer sections to provide vertical passageways therebetween, said vertical passageways connecting with said top horizontal passage, the lower of said containers in each tier spaced from the bottom portions of the drawer sections to provide a bottom horizontal passage, said bottom horizontal passage connecting with vertical passageways, said primary refrigerant section having an inlet passage connecting with said top horizontal passage, and an outlet passage connecting with said bottom horizontal passage, said primary refrigerant section having an insulated air chamber containing air, means for refrigerating the air, and means for blowing the refrigerated air out said inlet into said top horizontal passage, down said vertical passageways, thence along said bottom horizontal passage through said outlet passage to said primary refrigerant section, to complete the cycle.

9. A refrigerated system comprising a plurality of drawer sections having closed top and bottom portions and open ends, said drawer sections adapted to be joined together and to receive additional drawer sections, an end panel section having closed top, bottom, and end portions, and positioned to close an open end of one of said drawer sections, and a primary refrigerant section having closed top, bottom and end portions and positioned to close the other open end of said drawer sections, said drawer sections having containers withdrawable from the exterior of the system, said containers in said drawer sections being imperforate and in a vertical tier, the uppermost of said containers spaced from the top portions of the drawer sections to provide a top horizontal passage, said drawer sections spaced from adjacent drawer sections to provide vertical passageways therebetween, said vertical passageways connecting with said top horizontal passage, the lower of said containers in each tier spaced from the bottom portions of the drawer sections to provide a bottom horizontal passage, said bottom horizontal passage connecting with vertical passageways, said primary refrigerant section having an inlet passage connecting said top horizontal passage, and an outlet passage connecting with said bottom horizontal passage, said primary refrigerant section having an insulated air chamber containing air, means for refrigerating the air, and means for blowing the refrigerated air out said inlet into said top horizontal passage, down said vertical passageways, thence along said bottom horizontal passage through said outlet passage to said primary refrigerant section, to complete the cycle.

10. A refrigerated system comprising a plurality of container sections having closed top and bottom portions and open ends, said container sections adapted to be joined together and to receive additional container sections, an end panel section having closed top, bottom, and end portions, and positioned to close an open end of one of said container sections, and a primary refrigerant section having closed top, bottom and end portions and positioned to close the other open end of said container sections, said container sections having portions accessible from the exterior of the system, said container sections being imperforate and in a vertical tier, the uppermost of said container portions spaced from the top portions of the container sections to provide a top horizontal passage, said container sections spaced from adjacent container sections to provide vertical passageways therebetween, said vertical passageways connecting with said top horizontal passage, the lower of said container portions in each tier spaced from the bottom portions of the container sections to provide a bottom horizontal passage, said bottom horizontal passage connecting with vertical passageways, said primary refrigerant section having an inlet passage connecting with said top horizontal passage, and an outlet passage connecting with said bottom horizontal passage, said primary refrigerant section having an insulated air chamber containing air, means for refrigerating the air, and means for blowing the refrigerated air out said inlet into said top horizontal passage, down said vertical passageways, thence along said bottom horizontal passage through said outlet passage to said primary refrigerant section, to complete the cycle.

WILLIAM McKINLEY BAIRD.

REFERENCES CITED

The following references are of record in the file of this patent:

UNITED STATES PATENTS

| Number | Name | Date |
|---|---|---|
| 1,961,070 | Murphy | May 20, 1934 |
| 2,145,892 | Roberts | Feb. 7, 1939 |
| 2,163,182 | Warren | June 20, 1939 |
| 2,198,239 | Baird | Apr. 23, 1940 |
| 2,226,962 | Baird | Dec. 31, 1940 |
| 2,218,632 | Baird | Oct. 22, 1940 |
| 2,246,342 | Brown | June 17, 1941 |
| 2,277,382 | Botz | Mar. 24, 1942 |
| 2,341,200 | Yoxsimer | Feb. 8, 1944 |
| 2,375,688 | Quatman | May 8, 1945 |
| 2,405,834 | Kleist | Aug. 13, 1946 |